US009983025B2

(12) United States Patent
Zuta et al.

(10) Patent No.: US 9,983,025 B2
(45) Date of Patent: May 29, 2018

(54) MOTION SENSOR

(71) Applicant: RADIANCY, INC., Orangeburg, NY (US)

(72) Inventors: Idan Zuta, Kfar Saba (IL); Dolev Rafaeli, Creskill, NJ (US); Philip Solomon, Kibbutz Tzora (IL)

(73) Assignee: ICTV Brands, Inc., Wayne, PA (US)

( * ) Notice: Subject to any disclaimer, the term of this patent is extended or adjusted under 35 U.S.C. 154(b) by 324 days.

(21) Appl. No.: 14/904,704

(22) PCT Filed: Jun. 18, 2014

(86) PCT No.: PCT/US2014/042821
§ 371 (c)(1),
(2) Date: Jan. 13, 2016

(87) PCT Pub. No.: WO2015/009387
PCT Pub. Date: Jan. 22, 2015

(65) Prior Publication Data
US 2016/0153807 A1 Jun. 2, 2016

Related U.S. Application Data

(60) Provisional application No. 61/846,020, filed on Jul. 14, 2013.

(51) Int. Cl.
G01D 5/14 (2006.01)
G01P 3/487 (2006.01)
G05B 15/02 (2006.01)

(52) U.S. Cl.
CPC .............. G01D 5/145 (2013.01); G01P 3/487 (2013.01); G05B 15/02 (2013.01)

(58) Field of Classification Search
CPC .......... G01D 5/145; G01P 3/487; G05B 15/02
(Continued)

(56) References Cited

U.S. PATENT DOCUMENTS 6,268,720 B1 7/2001 Groos
6,825,445 B2 11/2004 Shalev et al.
(Continued)

FOREIGN PATENT DOCUMENTS

DE 10259223 B3 12/2004
EP 1571424 A1 9/2005
(Continued)

OTHER PUBLICATIONS

First office action from China Patent Office for parallel application CN201480050551.7 translation received Apr. 6, 2017.
(Continued)

Primary Examiner — Harry W Byrne
(74) Attorney, Agent, or Firm — Simon Kahn; Chanoch Kahn

(57) ABSTRACT

A motion sensor constituted of: a housing; a rotating member secured to the housing and arranged to rotate about a rotation axis of the rotating member responsive to motion of the housing across a surface; at least one bipolar magnet secured to the rotating member so as to rotate about the rotation axis of the rotating member with the rotation of the rotating member; and a transducer secured to the housing and juxtaposed with the rotating member, the transducer arranged to vary its output voltage in response to changes in magnetic field caused by the rotation of the at least one bipolar magnet.

24 Claims, 15 Drawing Sheets

(58) Field of Classification Search
USPC .......................................................... 700/275
See application file for complete search history.

(56) References Cited

U.S. PATENT DOCUMENTS

| | | | |
|---|---|---|---|
| 7,170,034 B2 | 1/2007 | Shalev et al. | |
| 7,202,446 B2 | 4/2007 | Shalev et al. | |
| 8,319,152 B2 | 11/2012 | Shalev et al. | |
| 8,367,974 B2 | 2/2013 | Azar et al. | |
| 8,389,906 B2 | 3/2013 | Azar et al. | |
| 2003/0128026 A1 | 7/2003 | Lutz | |
| 2004/0017190 A1 | 1/2004 | McDearmon et al. | |
| 2005/0103103 A1* | 5/2005 | Newman | G01F 23/32 73/313 |
| 2005/0253578 A1 | 11/2005 | Kawashima et al. | |
| 2006/0164077 A1 | 7/2006 | Mehnert et al. | |
| 2006/0261765 A1* | 11/2006 | Prasanna | H02K 49/046 318/400.01 |
| 2009/0292502 A1* | 11/2009 | Gress | B08B 9/045 702/163 |
| 2010/0090690 A1 | 4/2010 | Lohberg et al. | |
| 2011/0025311 A1 | 2/2011 | Chauvin et al. | |
| 2011/0319865 A1 | 12/2011 | Buss | |

FOREIGN PATENT DOCUMENTS

| | | |
|---|---|---|
| IL | 168712 B | 11/2010 |
| WO | 2004008075 A2 | 1/2004 |
| WO | 2013011505 A1 | 1/2013 |

OTHER PUBLICATIONS

International Search Report for parent PCT application PCT/US2014/042821, issued by European Patent Office dated Nov. 5, 2014.
Written Opinion for International Search Report for parent PCT application PCT/US2014/042821, issued by European Patent Office dated Nov. 5, 2014.
Marcel Urban, Achieve High Resolution With Robust Magnetic Motion Sensors, posted on www.ecnmag.com on Jul. 21, 2010.
Communication pursuant to Article 94(3) EPC issued by European Patent Office dated Jul. 20 for parallel European Application 14744663.7.
Response to first office action for China Patent Office for parallel application CN201480050551.7 filed Apr. 17, 2017.
Second office action from China Patent Office for parallel application CN201480050551.7 dated May 11, 2017.

* cited by examiner

MOTION SENSOR

TECHNICAL FIELD

The present invention relates generally to the field of motion sensors and more particularly to a motion sensor based on deployment of one or more bipolar magnets within a rotating device.

BACKGROUND

Motion sensors are often utilized to detect motion of an object in relation to a surface. For example a speedometer in a vehicle is a type of motion sensor which detects the speed of motion along a road surface responsive to the rotation of a wheel of the vehicle. Motion sensors are also often used in motor control to detect and control the angular momentum thereof.

Another use of a motion sensor is illustrated herein in relation to the no!no! electric shaver available from Radiancy, Inc. of Orangeburg, N.Y., variously described in U.S. Pat. Nos. 6,825,445; 7,170,034; 7,202,446; 8,319,152; 8,367,974 and 8,389,906 the entire contents of each of which are incorporated herein by reference. In particular, in order to avoid skin burn, control of a shaving head comprising a heated element is performed responsive to detected motion.

FIG. 1A illustrates a high level schematic of an embodiment of an electric shaver 10 comprising: a case 20; a first roller 30 having a groove 35 disposed about the circumference thereof; an electric generator 40; a belt 50; a controller 60; a heated element 70; and a second roller 80 which can simply be a wheel or other fixed support instead (not shown). Case 20 secures first roller 30 and second roller 80 so as to provide smooth gliding motion for case 20 when juxtaposed with a skin surface 90, allowing for smooth motion along the skin in either of 2 opposing directions as shown by the arrows. In some embodiments, gliding in only one direction is allowed so as to ensure proper treatment.

Electric generator 40 is coupled to an input of controller 60 and heated element 70 is coupled to an output of controller 60. Belt 50 is arranged to sit within groove 35 and translate angular momentum of first roller 30, experienced by groove 35 to electric generator 40. Controller 60 thus receives an electric signal from electric generator 40 whose amplitude and sign are responsive to the speed and direction of motion of case 20 along skin surface 90. Controller 60 is arranged to control heated element 70 responsive the detected motion, and in particular to provide power to heated element 70 responsive to the detected motion of first roller 30. Optionally (not shown) the location of heated element 70 is further adjusted responsive to controller 60, typically by setting the distance between heated element 70 and skin surface 90 to a shaving position responsive to a detected motion in a predetermined travel direction in excess of a predetermined minimum, and setting the distance between heated element 70 and skin surface 90 to a stand-off position in the absence of such a detected motion. Second roller 80 provides a second rolling support for case 20 against skin surface 90.

The use of belt 50 to translate the motion of first roller 30 to electric generator 50 is however cumbersome and leads to failure due to the tendency of shaved hairs from skin surface 90 to clog the smooth motion thereof. Integrating electric generator 50 within first roller 30 is costly, since it requires electrical connections to a rotating body.

FIG. 1B illustrates a high level schematic of an embodiment of an electric shaver 100 which is in all respects similar to electric shaver 10 of FIG. 1A with the exception that a plurality of heated elements 70 are provided, and electric shaver 100 additionally exhibits a supply tether 110. Supply tether 110 may provide electric mains based power, a DC power and/or a coolant fluid for electric shaver 100 without exceeding the scope.

U.S. Published Patent Application S/N 2003/0128026 to Lutz, the entire contents of which is incorporated herein by reference, is addressed to device for sensing rotor position and detecting rotational speed over a broad range of speeds in an electric motor comprising a sense ring magnet and two analog Hall effect sensors. The requirement for a sense ring magnet adds to cost, may limit resolution and also may be a driver of minimal size limitations.

World Intellectual Property Organization International Publication WO 2004/008075 A2 to The Timken Company, the entire contents of which is incorporated herein by reference, is addressed to an apparatus and method for sensing absolute angular position. One or more linear position sensor are placed near a degrading surface of a shaft or other rotating component. The rotation of the shaft varies the air gap between the sensor and the degrading surface thereby generating signal that can be processed to determine various operating parameters of the rotating component. The requirement for a degrading surface, and the material requirements to ensure a proper output of the linear position sensor, add complexity to the mechanical design, and requires careful control of the relative position of the linear position sensor and the degrading surface, which adds to cost.

It would be desirable to provide a motion sensor arranged to detect rotational motion, preferably suitable for use with an electric shaver or other aesthetical/medical treatment apparatus, at a reduced cost.

SUMMARY

Accordingly, it is a principal object to overcome at least some of the disadvantages of prior art. This is accomplished in certain embodiments by providing a rotating member having affixed thereto one or more bipolar magnets. A transducer is further provided arranged to vary its output voltage in response to changes in magnetic field, the transducer juxtaposed with the rotating member so as to detect changes in the magnetic field from the rotation of the one or more bipolar magnets. The output of the transducer is received by a controller arranged to determine angular rotation of the rotating member responsive the varying output of the transducer. In one embodiment, the transducer is a Hall effect sensor. In other embodiments there may be more than one sensor in the transducer.

Embodiments herein enable an aesthetic or medical treatment device comprising: a housing; a controller; a treatment element responsive to the controller; and a motion sensor, the controller arranged to receive information from the motion sensor and to adjust operation of the treatment element responsive thereto, the motion sensor comprising: a rotating member secured to the housing and arranged to rotate about a rotation axis of the rotating member responsive to motion of the housing across a skin surface to be treated; at least one bipolar magnet fixed within the rotating member so as to rotate together with rotating member; and a transducer secured to the housing and juxtaposed with the rotating member, the transducer arranged to read at least one magnetic field component (MFC) of the at least one bipolar magnet, and provide an output signal indicative of rotation of the rotating member.

In one embodiment, the magnetic axis of the at least one bipolar magnet is perpendicular to the rotation axis and wherein the transducer is parallel to the rotation axis. In one further embodiment, the at least one bipolar magnet comprises two bipolar magnets set orthogonally to each other and wherein the transducer is comprised of two magnetic field sensors, and wherein each of the magnetic field sensors is juxtaposed with a particular one of the two bipolar magnets. In one yet further embodiment the transducer is a Hall effect sensor, and optionally, the Hall effect sensor is one of a 2 dimensional Hall effect sensor and a 3 dimensional Hall effect sensor.

In one embodiment the aesthetic or medical treatment device further comprises a motion determiner arranged to receive the output of the transducer, the motion determiner arranged to determine the rate of motion of the housing across the surface responsive to the received output, and output the determined motion to the controller. In one further embodiment the motion determiner is arranged to determine velocity. In one yet further embodiment the motion determiner is arranged to determine direction of motion of the housing in relation to the skin surface. In another yet further embodiment the motion determiner is arranged to determine the position of the housing on the skin surface. In yet another further embodiment the motion determiner is arranged to determine at least two of: velocity; direction of motion of the housing in relation to the skin surface; and the position of the housing on the skin surface.

In one embodiment the MFCs are perpendicular to each other. In another embodiment the at least one bipolar magnet is centered in the rotation axis of the rotating member.

Independently embodiments herein enable a motion sensor comprising: a housing; a rotating member secured to the housing and arranged to rotate about a rotation axis of the rotating member responsive to motion of the housing across a surface; at least one bipolar magnet secured to the rotating member so as to rotate about the rotation axis of the rotating member with the rotation of the rotating member; and a transducer secured to the housing and juxtaposed with the rotating member, the transducer arranged to vary its output voltage in response to changes in magnetic field caused by the rotation of the at least one bipolar magnet.

In one embodiment the at least one bipolar magnet comprises two bipolar magnets set orthogonally to each other. In another embodiment the transducer is a Hall effect sensor. In one further embodiment the Hall effect sensor is one of a 2 dimensional Hall effect sensor and a 3 dimensional Hall effect sensor.

In one embodiment the at least one bipolar magnet comprises two bipolar magnets set orthogonally to each other, and wherein the transducer comprises two Hall effect sensors, each of the Hall effect sensors set orthogonally to each other.

In one embodiment, the motion sensor further comprises a motion determiner arranged to receive the output of the transducer, the motion determiner arranged to determine the rate of motion of the housing across the surface responsive to the received output. In one further embodiment the motion determiner is arranged to determine the rate of rotation of the rotating member responsive to the received output, the rate of motion determined responsive to the determined rate of rotation. In another further embodiment the motion determiner is arranged to: receive at least one magnetic vector component from the transducer; normalize the received at least one vector component; and determine the rate of motion responsive to the normalized received at least one vector component.

In one embodiment the motion sensor is adapted to be placed in an aesthetical or medical treatment device. In another embodiment the motion sensor is adapted to detect velocity and direction of motion of the housing across the surface. In one embodiment the rotating member diameter is smaller than 20 mm. In another embodiment the distance between the rotation axis and the transducer is smaller than 20 mm.

Additional features and advantages will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1A:
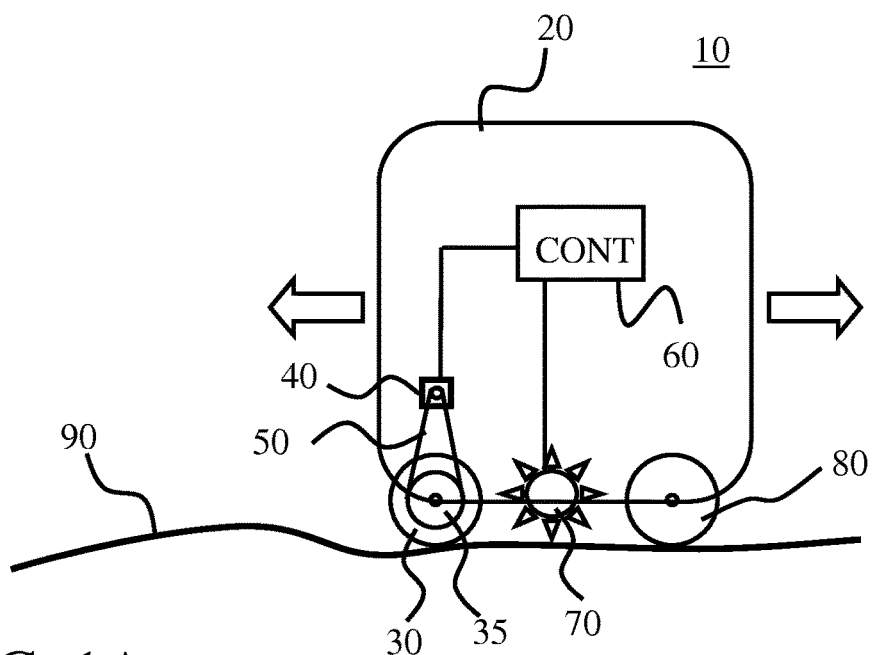
FIG. 1A illustrates a high level block diagram of a heated element based shaver exhibiting a belt driven motion sensor.
Figure 1B:
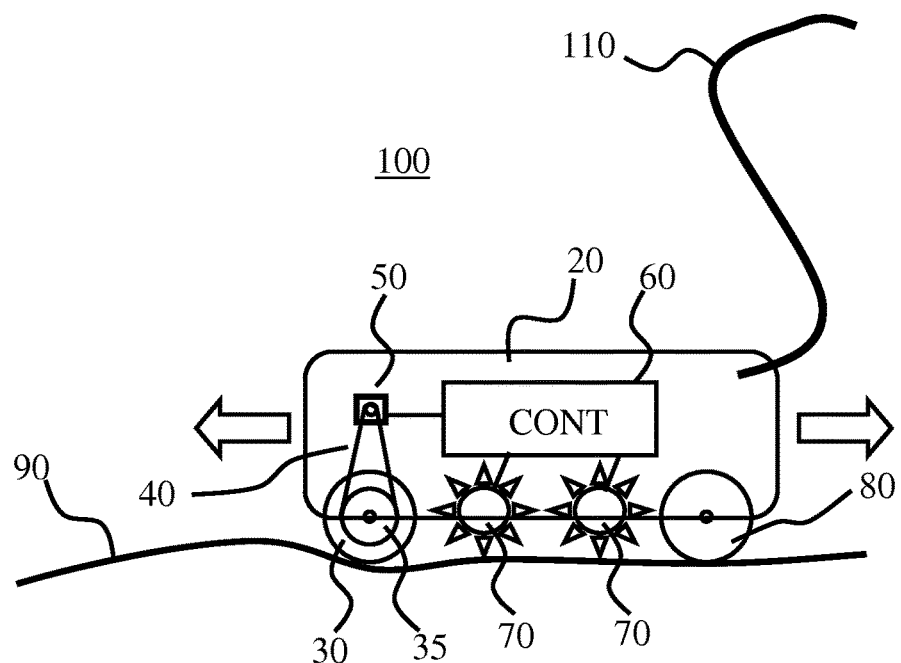
FIG. 1B illustrates a high level block diagram of a heated element based shaver exhibiting a belt driven motion sensor, a plurality of heated elements and a supply tether.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
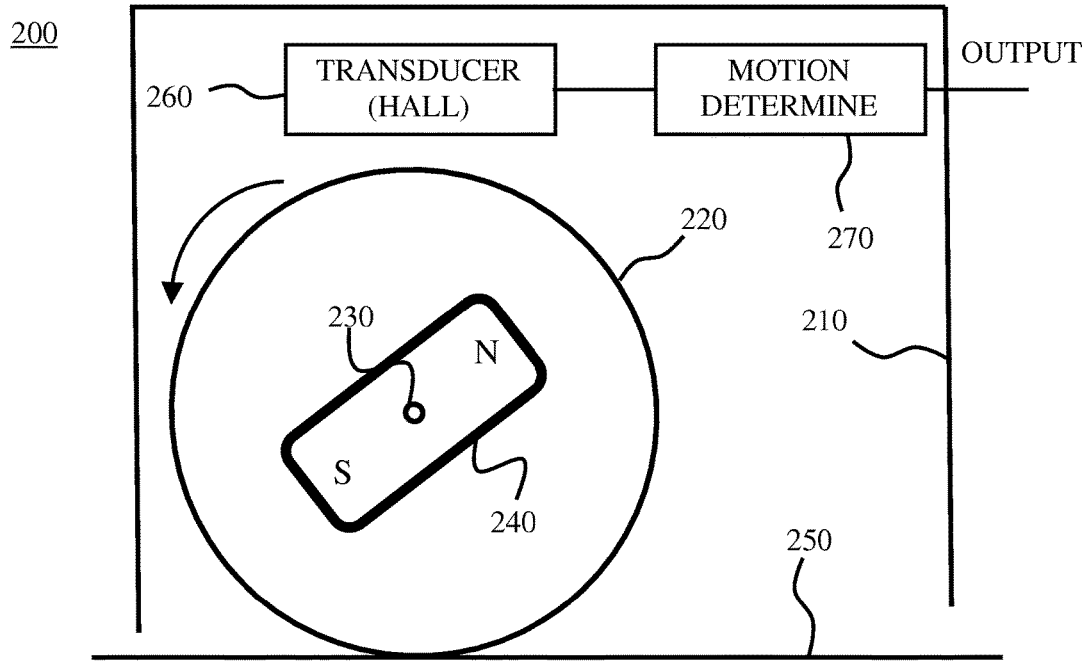
FIG. 2A illustrates a high level block diagram of an exemplary motion sensor with a single bipolar magnet.

FIG. 2A illustrates a high level block diagram of an exemplary motion sensor 200 comprising: a housing 210; a rotating member 220 arranged to rotate about a rotation axis 230 responsive to motion across surface 90, rotating member 220 secured to housing 210 and arranged to rotate responsive to motion of housing 210 across a surface 250; a bipolar magnet 240 secured to rotating member 220 and arranged to rotate about rotation axis 230 responsive to rotation of rotating member 220. Surface 250 is in one embodiment a skin surface. Transducer 260 is secured to housing 210 and juxtaposed with rotating member 220, and is set sufficiently close to rotating member 220 so as to vary its output voltage in response to changes in magnetic field caused by the rotation of bipolar magnet 240. Motion determiner 270 is arranged to receive the output of transducer 260 and determine the rate of motion of housing 210 in relation to surface 250 responsive to the output of transducer 260, as will be described further below. Motion determiner 270 is further arranged to output a signal indicative of the determined rate of motion. In one embodiment, motion determiner 270 is further arranged to determine the direction of motion of housing 210 in relation to surface 250, and further output a signal indicative of the direction of motion, the output signal indicative of motion direction may be combined with the output signal indicative of rate of motion without exceeding the scope.

Transducer 260 may be implemented by one or more Hall effect sensors, and each Hall effect sensor may be one dimensional Hall effect sensor, a 2 dimensional (2D) Hall effect sensor, or a 3 dimensional (3D) Hall effect sensor without exceeding the scope. Advantageously a 2D or 3D Hall effect sensor, or two 1D Hall effect sensors may further provide directional information to be determined by motion determiner 270.

Motion determiner 270 may be implemented in an ASIC, FPGA, controller, general purpose microcontroller, analog circuit, with or without a comparator, or state machine, without limitation, without exceeding the scope. Details of operation of motion determiner 270 will be described further below.

The term bipolar magnet is meant to include any magnet having no more than 2 poles. Thus, for example the sense ring magnet described above would not be termed a bipolar magnet, as it exhibits 4 or more poles. A bar magnet, or a disc magnet, each meet the definition of a bipolar magnet.

Figure 2B:
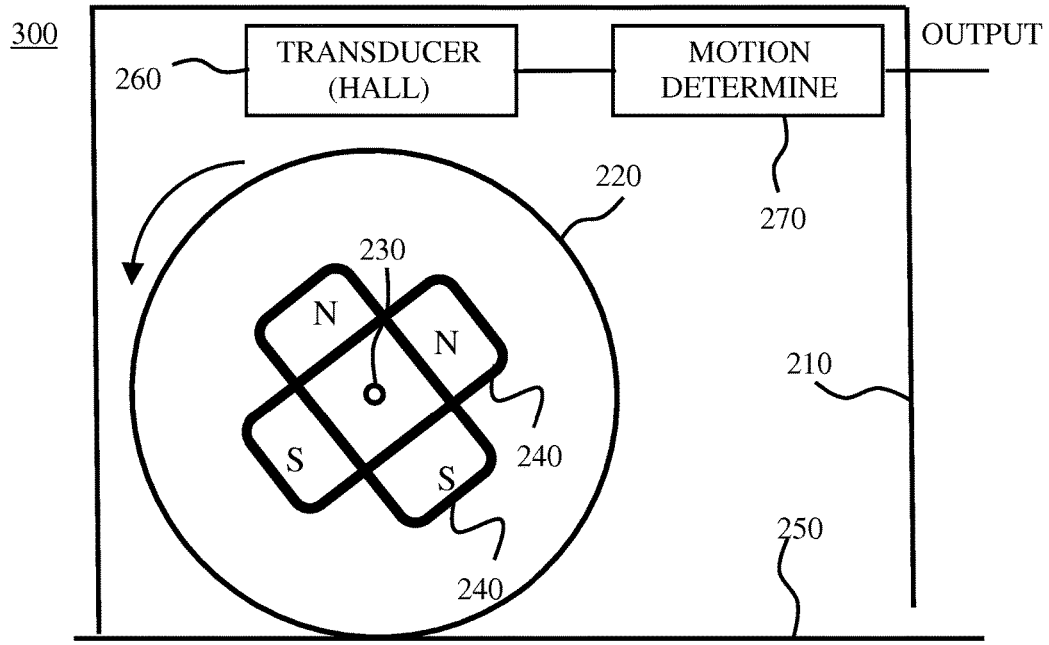
FIG. 2B illustrates a high level block diagram of an exemplary motion sensor with a pair of bipolar magnets.

FIG. 2B illustrates a high level block diagram of an exemplary motion sensor 300 which is similar to motion sensor 200, with the exception that a pair of bipolar magnets 240 are provided, set at right angles to each other. Additionally, in one embodiment transducer 260 comprises a pair of transducers, each juxtaposed with a particular one of bipolar magnets 240. Preferably, each of the transducers 260 are 1 D Hall effect sensor. While motion sensor 300 illustrates a pair of bipolar magnets 240 this is not meant to be limiting in any way, and 3 or more bipolar magnets arrayed evenly about rotating member 220, and arranged to rotate about rotation axis 230, may implemented without exceeding the scope.

Figure 3A:
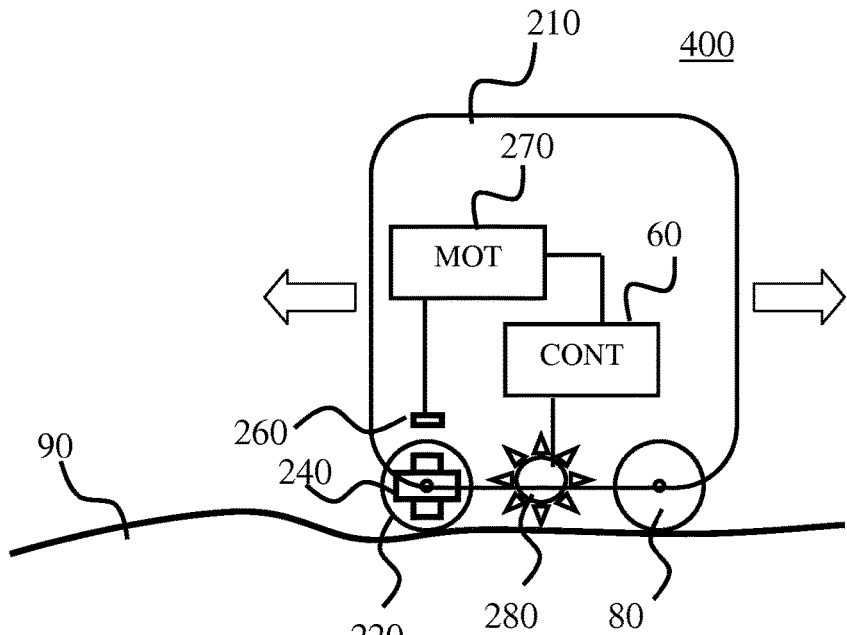
FIG. 3A illustrates an embodiment of the heated element based shaver of FIG. 1A utilizing the motion sensor of FIG. 2B.

FIG. 3A illustrates an embodiment of an aesthetical/medical treatment apparatus 400, such as an electric shaver, which may be similar to electric shaver 10, with the exception that motion sensor 300 has been provided in place of the belt driven sensor. Rotating member 220 having secured therein one or more bipolar magnets 240, of which two bipolar magnets 240 at right angles to each other are illustrated, rotates responsive to motion of housing 210 along surface 90. The rate of motion, and preferably the direction of motion, as indicated by the arrows, is determined by motion determiner 270 responsive to transducer 260. Controller 60 is in communication with motion determiner 270 and actuates a treatment element 280 responsive to the determined motion and desired treatment regime.

Treatment element 280 may comprises one or more heated elements 70, a heat source, a light source, a shaver or any kind of aesthetic or medical treatment mechanism, for example for treating skin or removing hair. There may be a number or combination of such treatment elements 280 without exceeding the scope.

Second roller 80 is optional, and may be replaced by one or more supporting walls, for example, or a housing, so that only one roller is utilized.

Figure 3B:
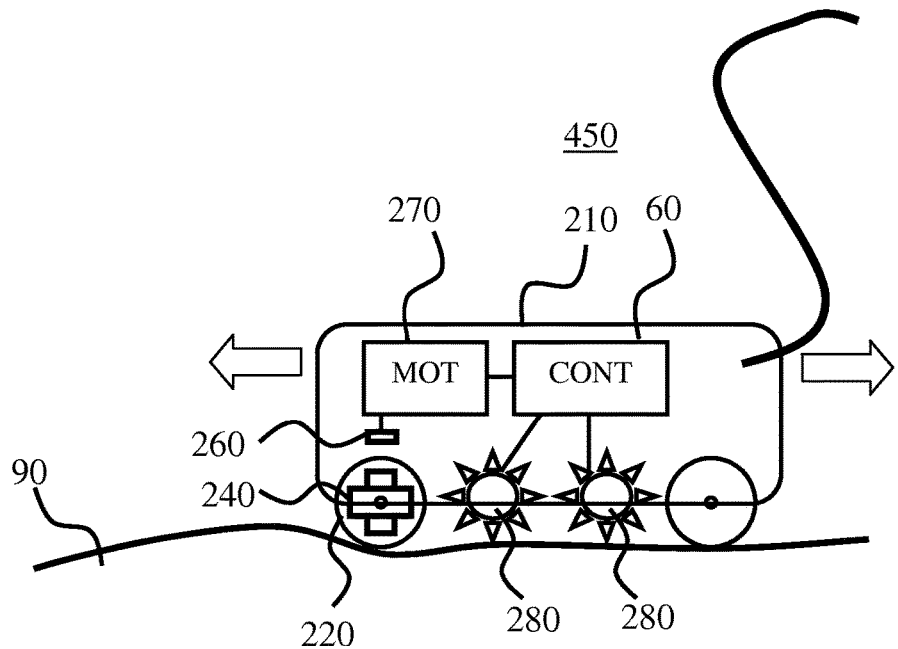
FIG. 3B illustrates an embodiment of the heated element based shaver of FIG. 1B utilizing the motion sensor of FIG. 2B.

FIG. 3B illustrates an embodiment of an aesthetical/medical treatment apparatus 450, such as an electric shaver, which may be similar to electric shaver 100, with the exception that motion sensor 300 has been provided in place of the belt driven sensor. Rotating member 220 having secured therein one or more bipolar magnets 240, of which two bipolar magnets 240 at right angles to each other are illustrated, rotates responsive to motion of housing 210 along surface 90. The rate of motion, and preferably the direction of motion, as indicated by the arrows, is determined by motion determiner 270 responsive to transducer 260. Controller 60 is in communication with motion determiner 270 and actuates treatment elements 280 responsive to the determined motion and according to desired treatment regime. Motion determiner 270 is illustrated as separate from controller 60, however integration of motion determiner 270 into controller 60 is preferred.

Motion determiner 270 may detect one or more of position, displacement, velocity, acceleration, deceleration, movement, and direction of motion of the housing 210 without exceeding the scope.

The terms motion, or rate of motion mentioned herein may refer to any one or more of the following: movement, direction, displacement, position, distance, velocity, acceleration and deceleration, and may be implemented as one or more analog/digital signals indicative of any of the mentioned terms.

Motion determiner 270, which may be implemented as part of controller 60, is arranged to receive one or more signals from transducer, or transducers, 260, and detects the rate of motion of interest. For example it may detect movement out of one magnet movement or speed or gliding distance out of two signals coming from two Hall effect sensors, each juxtaposed with a particular bipolar magnet 240 of roller 220.

Figure 4A:
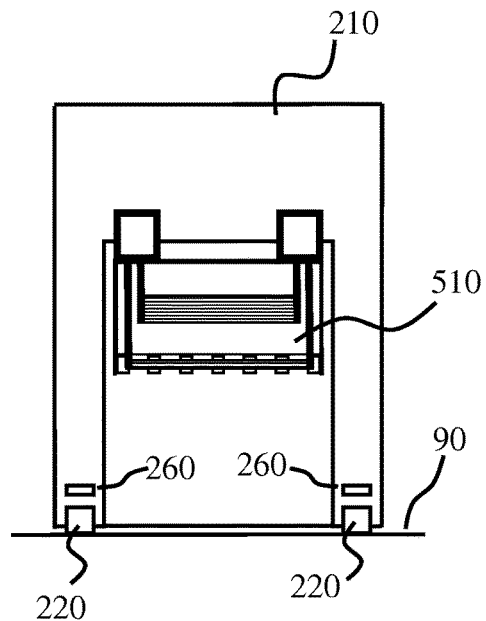
FIGS. 4A-4C illustrate various heated element based shavers, wherein the motion sensor of the prior art is replaced with the motion sensor as described herein.
Figure 4B:
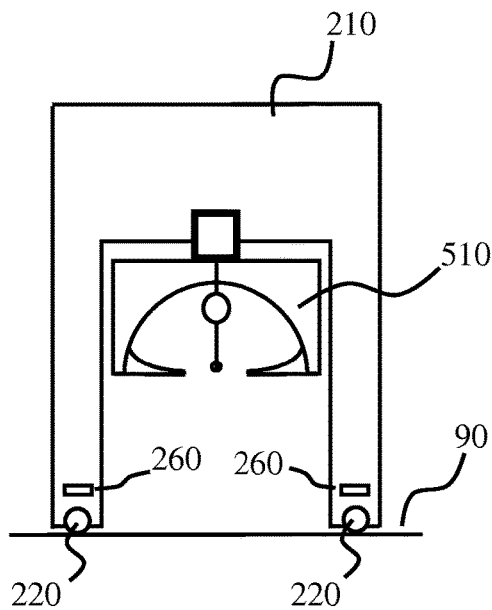
Figure 4C:
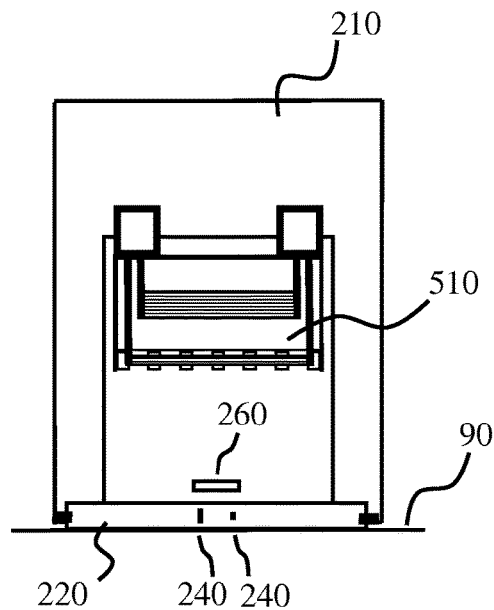

FIGS. 4A-4C illustrate various shavers, as depicted in WIPO publication WO 2013/011505, entitled "Hair Removal and Re-Growth Suppression Apparatus", the entire contents of which is incorporated herein by reference, wherein the motion sensor of the prior art is replaced with the motion sensor as described herein. FIGS. 4A and 4B each illustrate particular embodiments of shavers with hair re-growth suppression, comprising: housing 210; treatment head 510; rotating member 220 and transducer 260 juxtaposed with rotating member 220. Bipolar magnet, or bipolar magnets, 240 (not shown) are secured to rotating member 220 as described above. FIG. 4C similarly depicts a particular embodiments of a shaver with hair re-growth suppression, comprising: housing 210; treatment head 510; rotating member 220; first and second bipolar magnets 240; and transducer 260 juxtaposed with rotating member 220. Rotating member 220 is illustrated as a tubular or cylindrical member, having inserted therein first and second bipolar magnets 240 at right angles to each other.

In some further detail, FIG. 4A depicts one or more transducers 260 placed at either one, or both the sides, of housing 210 with rotating members 220 below, such as side wheels. FIG. 4B depicts one or more transducers 260 placed at front and/or rear areas of housing 210 with rotating members 220 below, such as wheels or rollers. FIG. 4C depicts a transducer 260 placed above a roller rotating member 220, wherein roller rotating member 200 can be in the front or rear areas of housing 201, preferably set so as not to interrupt action of treatment head 510, wherein rotating member 220 can include two bipolar magnets 240 at right angles to each other.

Transducer 260 is preferably placed above the rotation axis of the rotating member, and wherein the motion sensor is part of an aesthetical or medical treatment device and the surface is the human skin's surface. In this way transducer 260 does not interfere with the gliding of the roller, and there may be a small air gap between the transducer and the roller. Bipolar magnet(s) 240 are preferably placed perpendicularly to the rotation axis, and centered on the rotation axis, to maintain good readings from both sides of roller 220. It is desired to have magnets as big as possible to provide sufficient magnetic field. The sensor(s) of transducer 240 preferably face the rotation axis and placed in the middle line in front of the bipolar magnets 240, to maximize magnetic field reading.

Figure 5A:
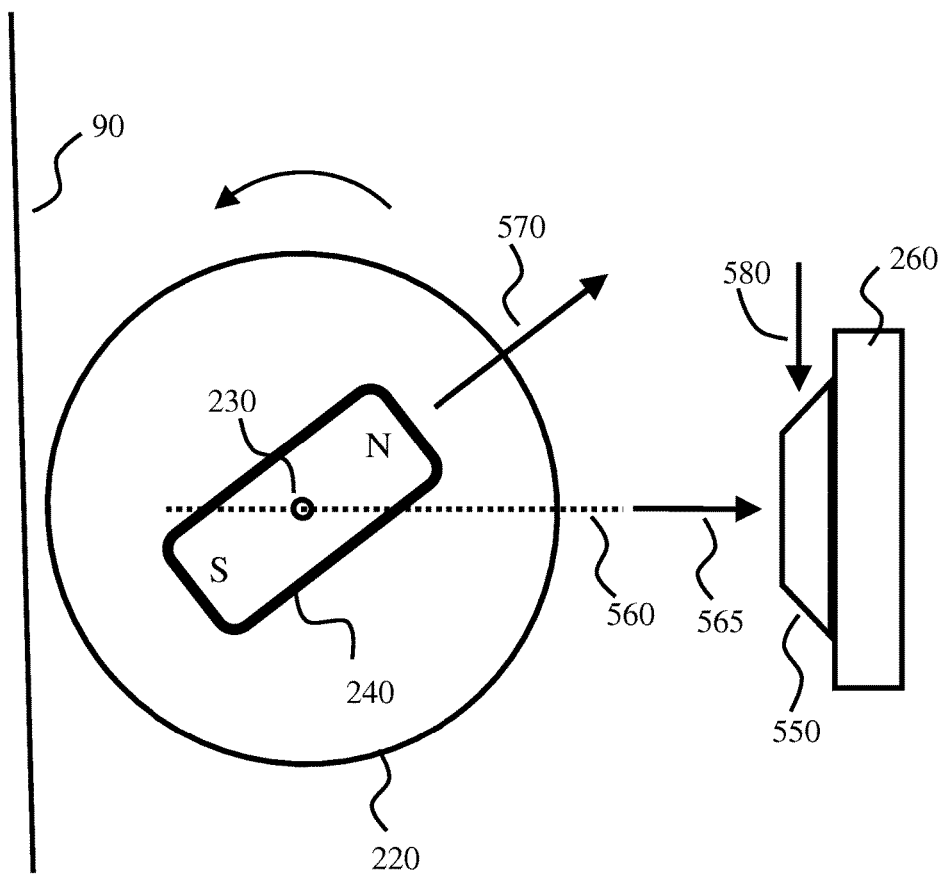
FIGS. 5A-5B illustrate certain relationships between an embodiment of an exemplary bipolar magnet secured to a rotating member juxtaposed with a sensor of a transducer.
Figure 5B:
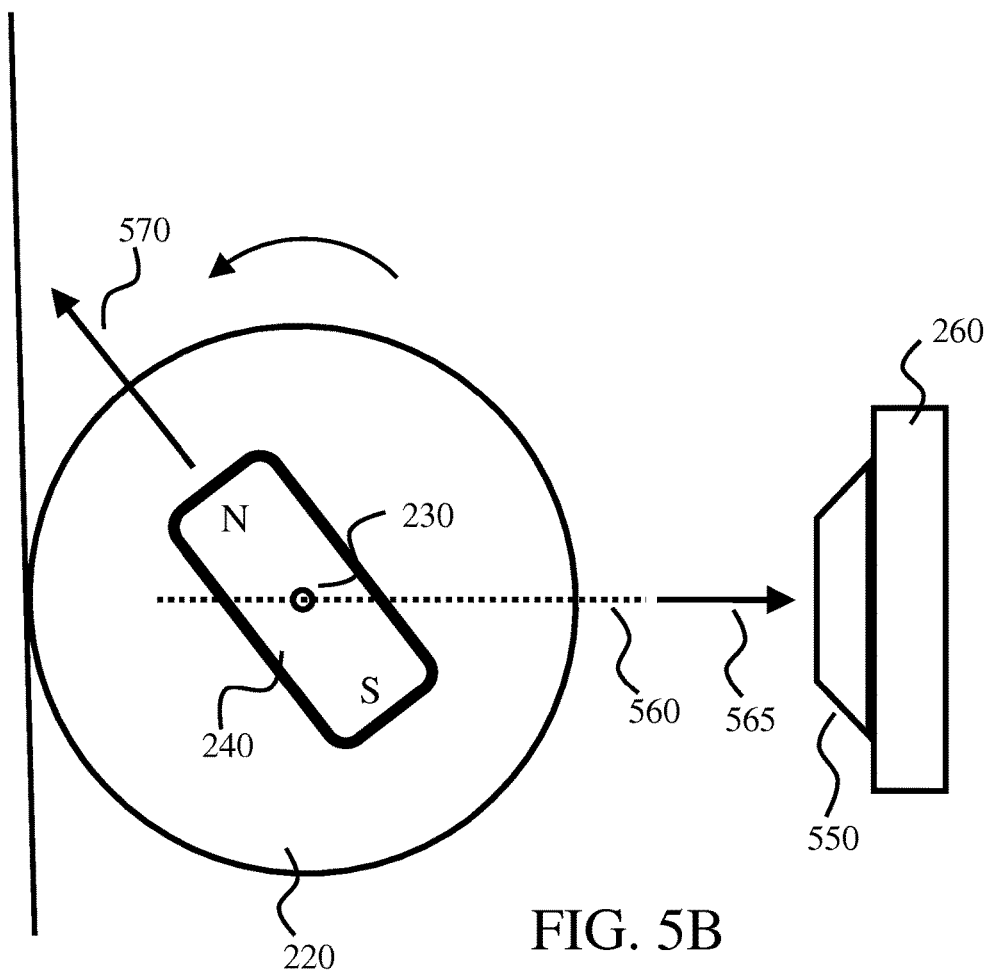

FIGS. 5A-5B illustrate certain relationships between an embodiment of bipolar magnet 240 secured to rotating member 220 and a sensor 550 of transducer 260. Referring to FIG. 5A, axis 560 is defined between rotation axis 230 and the center of sensor 550 of transducer 260. Parallel magnetic field component (MFC) 565 is in line with axis 560 and represents the MFC of bipolar magnet 240 read by sensor 550. The above is explained for clarity with a single bipolar magnet 240, it being understood that this may be a part of a multiple bipolar magnet 240 embodiment, in which there are two bipolar magnets 240 each with an associated sensor 550. In each of set of magnets 240/sensors 550 sensor 550 reads the corresponding MFC, and from the two MFCs motion can be derived. Parallel magnetic field 570 of bipolar magnet 240 is further depicted, showing an angle of about 45° counterclockwise from axis 560. Perpendicular MFC 580, which is orthogonal to MFC 565, represents the perpendicular MFC of bipolar magnet 240 read by sensor 550. In another embodiment, a 2D or 3D sensor, can read the two MFCs 565 and 580, and in such an embodiment motion can be derived by using a single bipolar magnet 240. It is also possible that only the perpendicular MFC 580 is read instead of MFC 565, as described. In certain embodiments parallel magnetic field component (MFC) 565 readings are stronger in amplitude than those of perpendicular MFC 580, and in such embodiments two MFCs 565, each in front of its respective associated bipolar magnet 240, may be used. Several sensors 550 can be present on the same transducer 260.

FIG. 5B illustrates the same relationships as in FIG. 5A for an incidence wherein parallel magnetic field 570 of another bipolar magnet 240, at an angle of about 135° counterclockwise from axis 560. FIG. 5B may similarly represent the fields experienced by a second sensor 550, which may be identical to sensor 550 of FIG. 5A, however juxtaposed with second bipolar magnet 240. First and second bipolar magnets 240 are rotated 90° with respect to each other about axis 230. Thus, FIGS. 5A and 5B may illustrate a single embodiment wherein a pair of sensors 550 is provided, each associated with one of a pair of bipolar magnets 240. First and second sensors 550 may be placed on the same plane of transducer 260, which may be implemented as a PCB on which the two sensors 550 are soldered, to provide equivalent MFC's, preferably of similar amplitudes, of respective bipolar magnets 240.

Figure 6A:
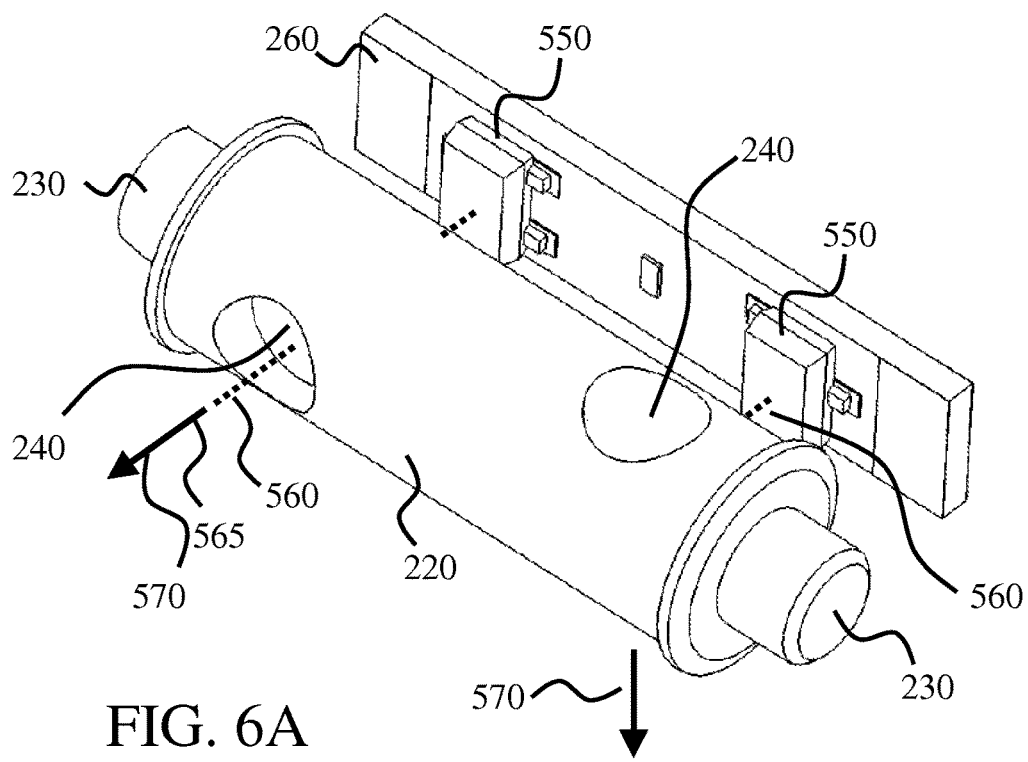
FIGS. 6A and 6B illustrate various views of an exemplary embodiment of a motion sensor wherein the rotating member is implemented as a cylinder.
Figure 6B:
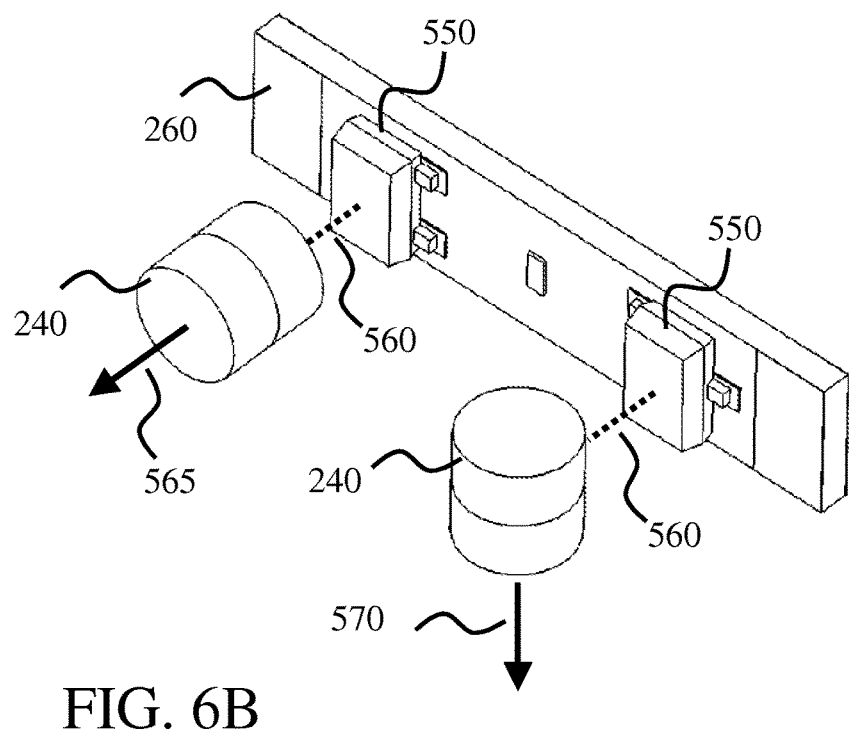

FIGS. 6A and 6B illustrate an embodiment of a motion sensor wherein rotating member 220 is implemented as a cylinder, wherein FIG. 6A illustrates an assembly of rotating member 220 in combination with transducer 260, and FIG. 6B illustrates the same arrangement as FIG. 6A with rotating member 220 removed for clarity. First and second bipolar magnets 240 are provided at disparate symmetric locations along the axial length of the cylinder 220, first and second bipolar magnets 240 set into rotating member 220 at right angles to each other. Each of first and second bipolar magnets 240 are illustrated as cylindrical magnets, without limitation. Transducer 260 exhibits a pair of sensors 550, each aligned with a particular bipolar magnet 240, respectively, and juxtaposed therewith so as to sense the changing magnetic field as the respective bipolar magnet 240 rotates with the rotation of cylinder 220 about rotation axis 230. Axes 560 for each of the sensors 550, respectively, is shown, as is parallel magnetic field 570 for each of the respective bipolar magnets 240. Parallel MFC 565 is further illustrated for one of the bipolar magnets 240. The other bipolar magnet 240 is rotated 90° away, and the respective sensor 550 thus experiences MFC (in direction as shown in FIG. 5B) 565 from the associated bipolar magnet 240 of a negligible amount.

The above has been described in an embodiment wherein a pair of bipolar magnets 240 are provided, each provided with an associate sensor 550, however this is not meant to be limiting in any way, and cylindrical rotating member 220 may be provided with a single bipolar magnet 240 without exceeding the scope. Sensor, or sensors, 550 may be a 2D or 3D sensor, such as dual 1D, 2D or 3D Hall effect sensors, and may thus provide directional information from a single bipolar magnet 240.

FIGS. 7A-7G illustrate plots of a pair of perpendicular bipolar magnets 240 rotating in accordance with the rotation of rotating member 220, at various distances from a sensor, wherein the x-axis represents rotational position in degrees and the y-axis represents the amplitude of the output signals of the respective sensor. Bipolar magnets 240 are in each case 3 mm in length, and the plots of the first bipolar magnet 240 is shown as a solid line, with the plot of the second bipolar magnet 240 shown as a broken line.

Figure 7A:
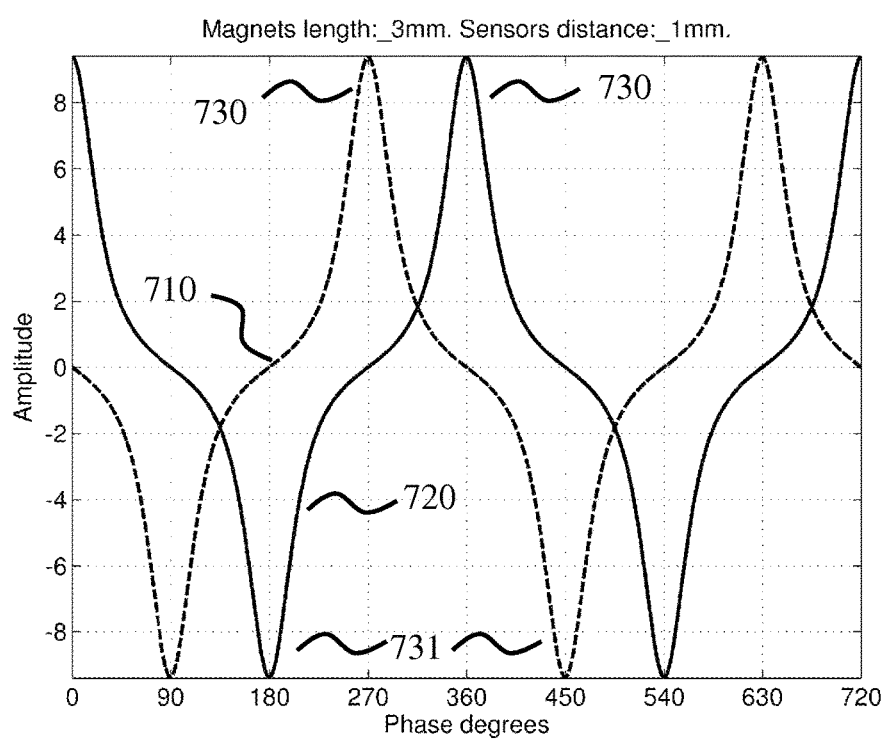
FIGS. 7A-7G illustrate plots of a pair of perpendicular bipolar magnets rotating in accordance with the rotation of a rotating member, at various distances from a sensor.

FIG. 7A shows the plot at a sensor distance of 1 mm, however it may be desired to implement roller 220 in a diameter of 5 mm, so that roller 220 can glide over curvatures of the skin, on the one hand, and not slide or descend too much into the soft skin on the other hand. In case roller 220 and magnets 240 are covered with protective layer, then the magnets' length can typically be 3-4 mm, thus it is not likely that sensor 550 will be arranged to sense the magnets from a distance of 1 mm, as shown in FIG. 7A, because an air gap, to allow the roller to move, is required as well. However, if such conditions are achieved, such as by not covering the magnets 240, or applying a very thin cover, then signals of sensor 550 can approximately be as illustrated. Higher slope areas 720 of the graph can be of more interest, for example in order to sense and calculate velocity. If determination of velocity or position with accuracy equivalent to a 90 degrees resolution of roller 220, i.e. a distance equivalent to quarter of the circumference of roller 220, then identifying peak values in advance may by sufficient. In such an embodiment, the output of the Hall effect sensors 260 may be compared with predetermined values, for example by analog comparators to identify the peaks 730 and 731 have been reached. Positive and negative thresholds can be defined for each of the signals in order to easily determine if and when roller 220 has reached one of the 90 degrees positions. If the absolute value of the amplitudes of the minimum and maximum values of the two signals are about the same, then threshold values for the two signals may be identical. In this way a resolution of about 4 mm is achieved for 5 mm diameter roller. Direction of movement can further be determined responsive to the order of peaks detected. For example if the maximum peak of the first sensor 550 is detected, and then subsequently the minimum peak of the second sensor 550 is detected, it can be defined as movement in the negative direction. Time between peak detections can be measured such as by using a microcontroller or by implementing a timer in hardware, which will result in a determination of velocity by measuring the time between the detection of peaks. Controller 60 may be set with a pre-determined maximum time, or minimal speed, which when received from motion determiner 270 will cause controller 60 to stop treatment in a maximum delay time of (d/vmin) wherein d is minimal distance resolution between peaks and vmin is minimal velocity allowed. Yet a more sophisticated algorithm can allow learning the shape of the signals in a calibration process, or in a design phase, and calculating the phase of the roller at each instant of time according to the signals intensity. From the change in phase, distance movement change dx can be derived. The velocity v can be calculated, if for example the signals are sampled each dt seconds (dt may be for example in the range of 500 us-500 ms), then v=dx/dt. Thus the velocity can be calculated faster and at a higher resolution. There might be a limitation however in locations where the signals has smaller slope, such as at area 710, in such cases, the signal of higher slope can be read. In particular, if there are two bipolar magnets 240 in 90 degrees phase from each other, then it is likely that one of the signals is of higher slope difference. In peak locations such as 730 and 731, it may be desired to read the other signal, which is then not at a peak, in order to better identify and track the slope of the signal. Since bipolar magnets 240 are fixed then it can be sufficient to read the rate of change of one the MFC of one of the bipolar magnets 240, in order to calculate velocity, for example, or detect movement. In order to detect direction of movement then the two signals are required because separately either one of them is symmetrical in movement forwards or backwards however together one of the signals advances the other depending on movement direction. A lookup table in which the phase of the roller is a function of the first and second signals can be made. Similar approaches can be made for sensing two MFCs of one magnet rather than sensing two MFCs—one for each magnet, bigger variances between the signals may occur and also shapes of the graphs may differ.

Figure 7B:
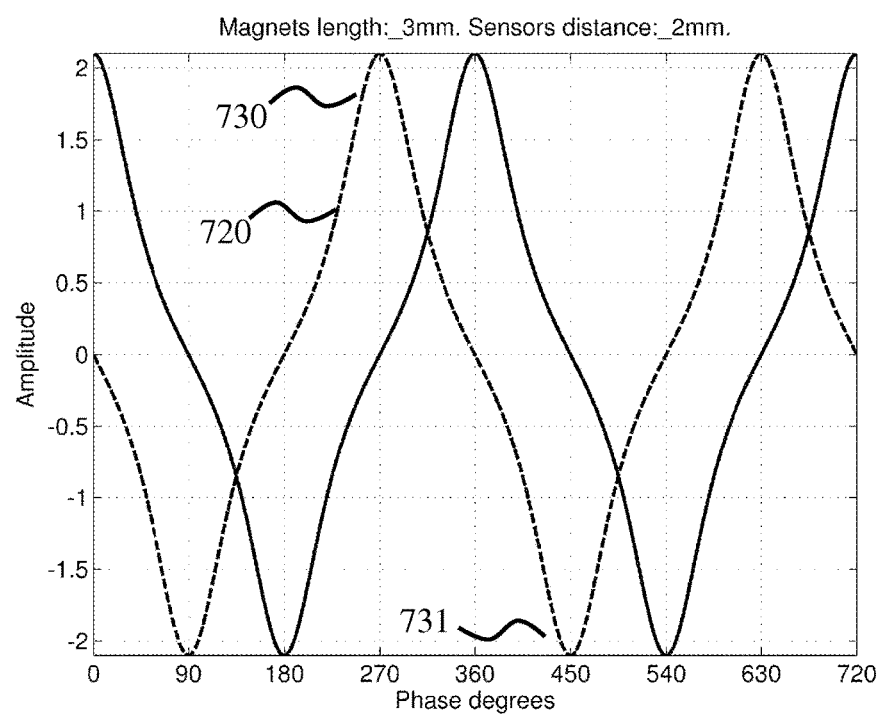

FIG. 7B shows the plot at a sensor distance of 2 mm; it can be seen that the amplitude is smaller than that of FIG. 7A, however higher slope areas 720 persist in relatively bigger portion of the signals almost to the minimum 731 and maximum 730 peaks. Such signals may be considered closer to linear, and thus may better relate linear changes in the signals to actual motion. Since the peaks herein differ in 90 degrees, then while one signal is at a minimum or a maximum range, the other is in the near linear range, and its difference can be tracked by measuring the difference between samples. Since noises may occur and the signal to noise ration (SNR) may be limited, then a linear approximation can simplify calculation of motion such as speed and improve response time. Linear Hall effect sensors can provide analog signals indicative of MFCs intensity. By reading these signal to a microcontroller embodiment of motion determiner 270 and implementing a simple algorithm, velocity may be calculated in high resolution, in each phase of the roller and at low cost.

Figure 7C:
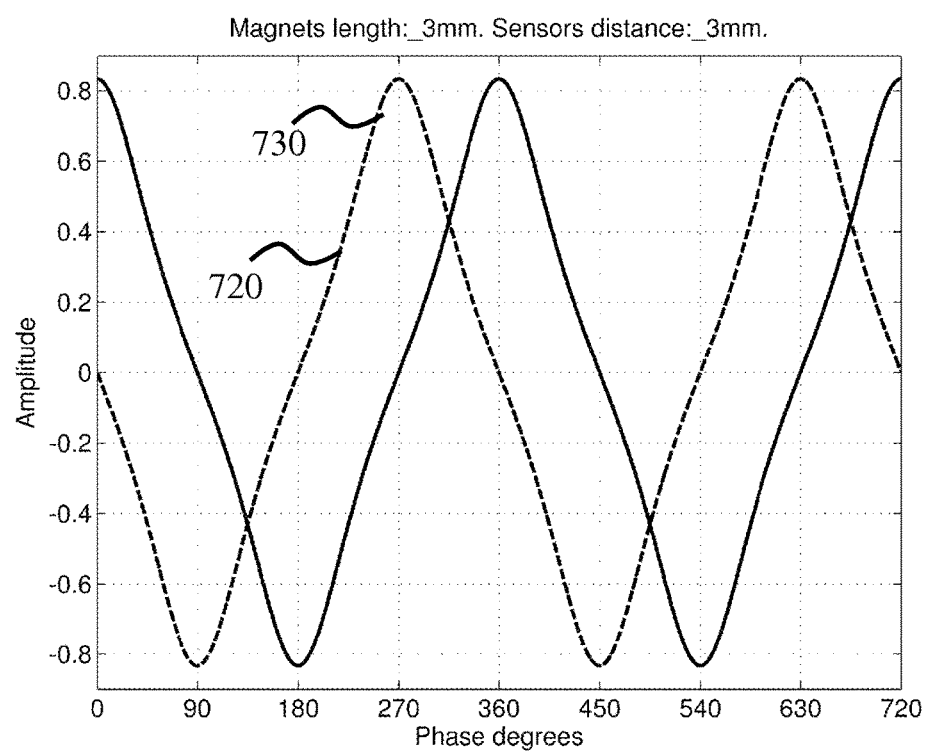

FIG. 7C shows the plot at a sensor distance of 3 mm; although the amplitude is much smaller than that of FIG. 7A, which is less desirable, higher slope areas 720 are close to straight line, thus the change measured in these areas dh divided to sampling rate, can be closely proportional to the velocity v~dh/dt. Defining the amplitude, such as by calibration or based on fixed setup, can give a constant c, by which v=c*dh/dt wherein dh is determined from the relevant area of one or both of the signals, such as the maximum change, and optionally the signals can be normalized so that their changes can be compared.

Figure 7D:
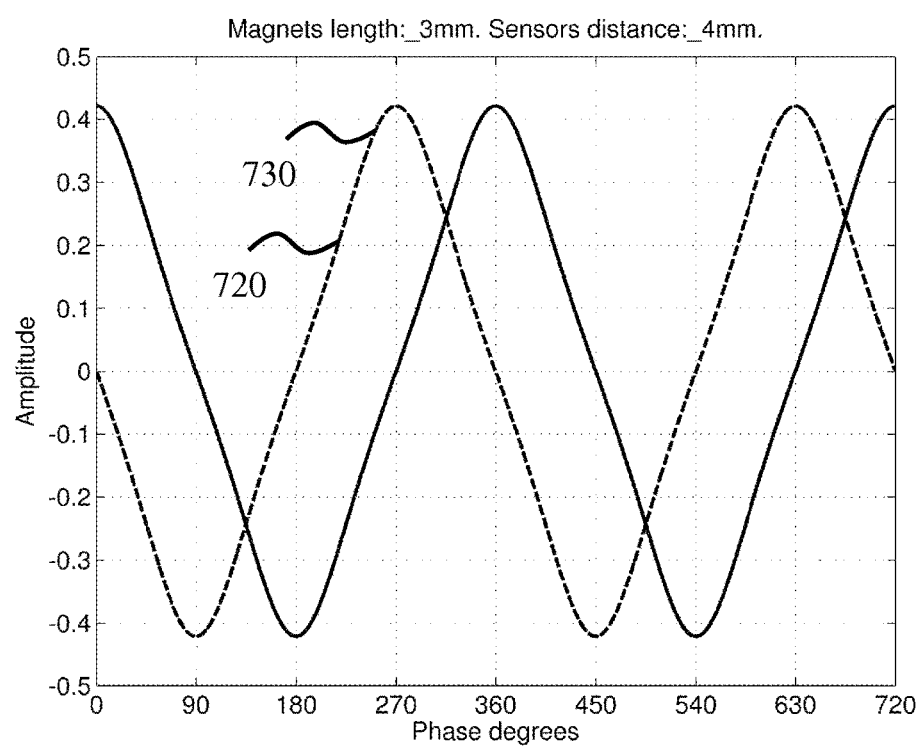

FIG. 7D shows the plot at a sensor distance of 4 mm; the amplitude of the signal is much smaller by departing the magnets by only one more millimeter, compared to that of FIG. 7C. Thus, it can be advantageous to place bipolar magnets 240 close to the Hall effect sensors of transducer 260 in order to have a bigger amplitude and better SNR of the signals.

Figure 7E:
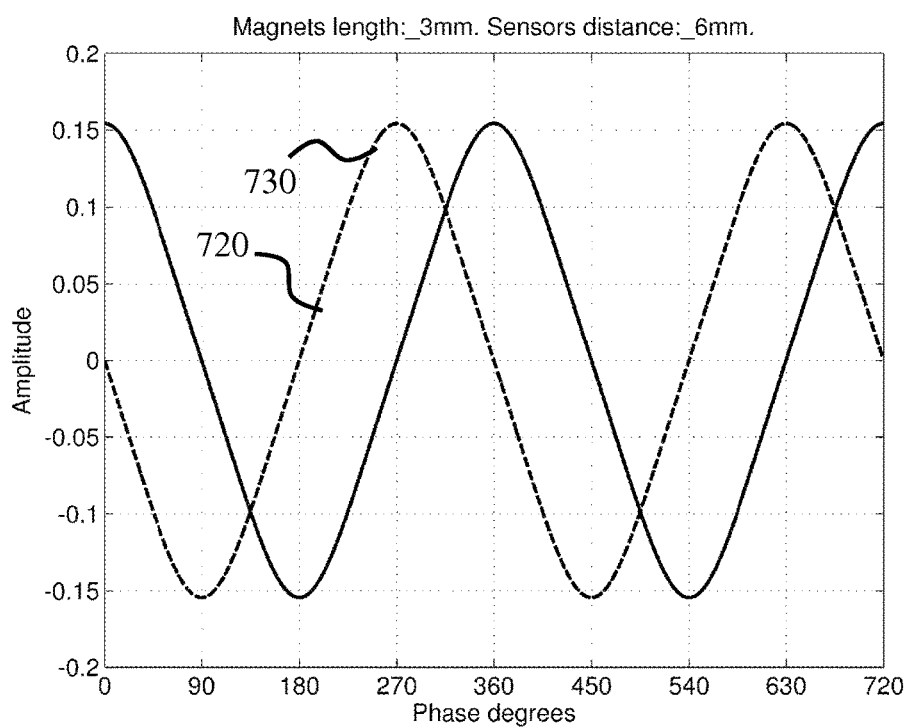

FIG. 7E shows the plot at a distance of 6 mm; although the signals' amplitude is much smaller than the signals of FIG. 7D, the signals are about linear in the zero amplitude region, and remain nearly linear almost until the minimum/maximum peaks. Thus, it could be possible to place sensors 550 of transducers 260 even at a distance of 6 mm from bipolar magnets 240.

Figure 7F:
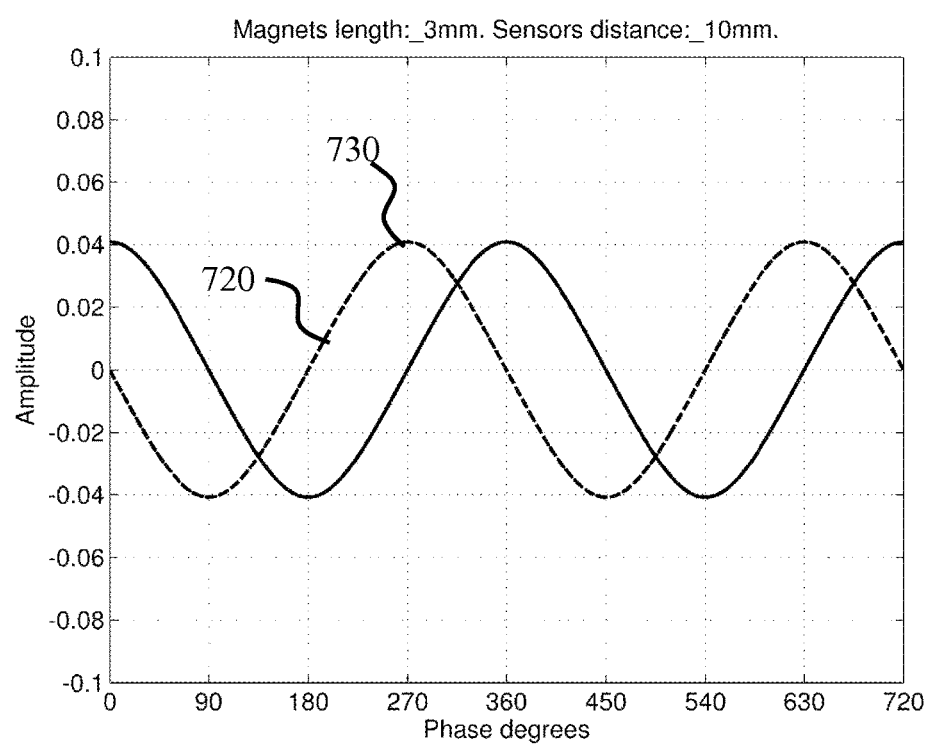
Figure 7G:
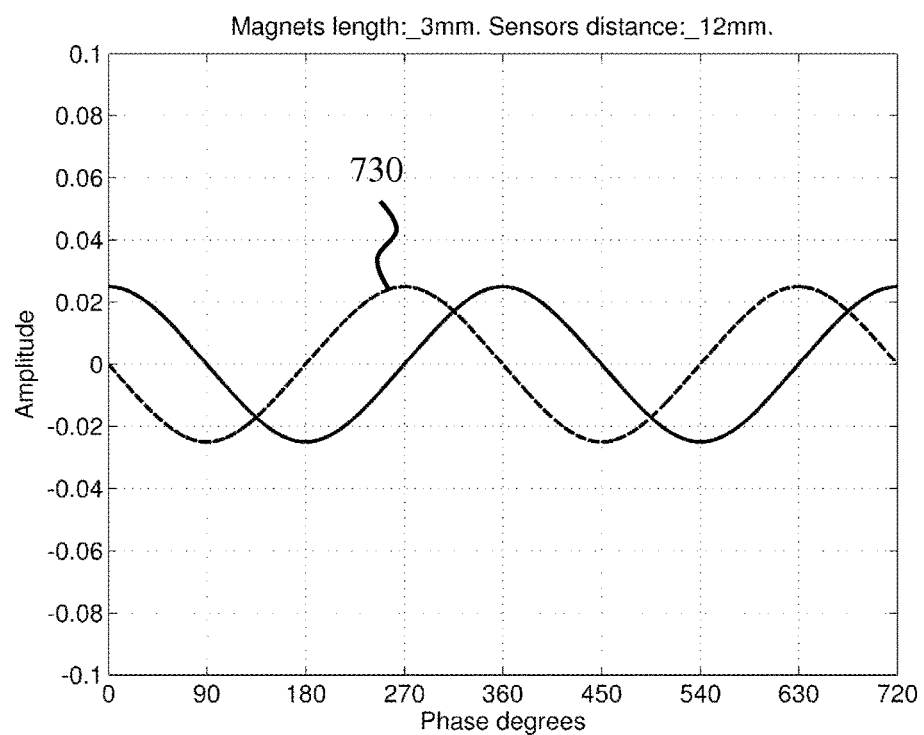

FIG. 7F shows the plot at a distance of 10 mm; and FIG. 7G shows the plot at a distance of 12 mm; in such embodiments the peaks areas may become larger and the amplitude smaller, however movement can still be detected at least by one sensor at a time. Velocity measurement accuracy may be limited, however position and direction may still be found. It can be seen that as the distance increases the amplitude falls off. Furthermore it can be seen that for each plot a linear region is noted, and a region wherein amplitude changes sharply with rotation can be seen.

FIG. 7A shows three regions, a sharply changing region 710; a linear region 720; and a maximum amplitude region 730, which are for simplicity only called out on the positive side of the graph, it being understood that the same designations occur on the negative side of the graph. Looking at FIG. 7G, only the maximum amplitude region is clearly identifiable, and thus, a closely spaced arrangement, such as the arrangements of FIGS. 7A-7E are preferred for improved discrimination.

Figure 8:
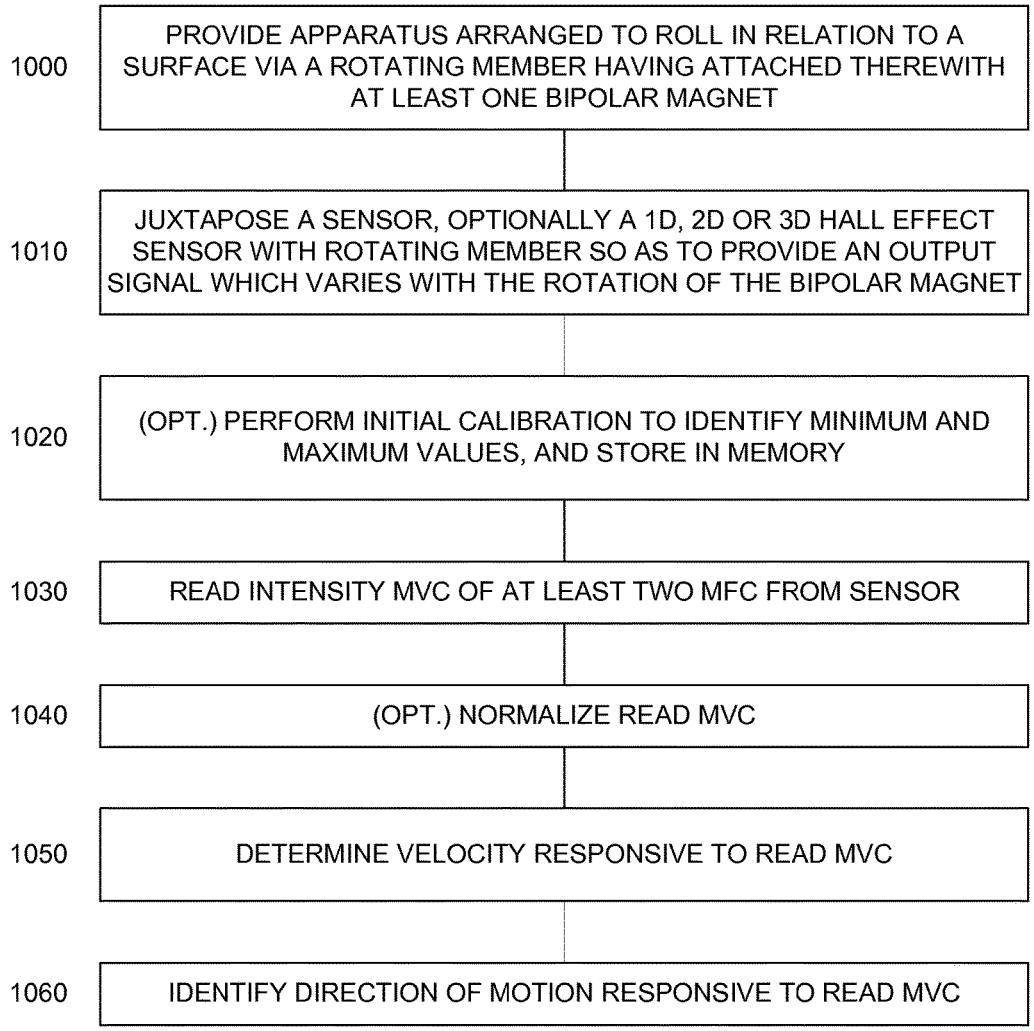
FIG. 8 illustrates a high level flow chart of a method of providing a motion sensor, and in particular details the method of operation of the motion determiner.

FIG. 8 illustrates a high level flow chart of a method of providing a motion sensor, and in particular details the method of operation of motion determiner 270. In stage 1000, an apparatus arranged to roll in relation to a surface is provided, the apparatus provided with a rotating member arranged to rotate when the apparatus is rolled in relation to the surface. Attached to the rotating member, and arranged to rotate therewith is at least one bipolar magnet.

In stage 1010, a sensor, such as a Hall sensor, which may be a 1D, 2D or a 3D linear sensor is juxtaposed with the rotating member of stage 1000, and arranged to vary its output voltage (or other indicative signal such as a digital word) in response to changes in MFC caused by the rotation of the bipolar magnet, or bipolar magnets. The sensor may be a plurality of individual sensors, each can be associated with a particular bipolar magnet. Preferably the sensor is placed at a point removed from the plane on which the roller is glided. This allows the roller to be part of the housing, not taking from the width of the housing and not likely to touch the surface (skin) on which the device is glided. Thus, the sensor is above (or at least in higher level) than that of the surface, for example it may be placed diagonally to the surface, but pointed towards the center of the roller. This also allows placing the magnets within the roller at selected locations in its cylinder (still preferably in the center of the roller if looking from a side view), and not necessarily close to one of its edges, as would be the case if it was desired to measure the magnetic field from one of the two side facets of the roller. Placing the sensors above the roller, as described herein (not in line with the roller axis of rotation), would also allow forming a preset air gap which influences the distance between the magnets and the sensors, this air gap is preferably above the roller or about above the center of the roller, so that it is less likely to get dirty, such as by hairs in a hair removal device, because it is more distant from the surface.

In optional stage 1020, an initial calibration is performed to identify and store in a memory maximum and minimum intensity values as read by the sensor of stage 1010 for at least one complete rotation of the rotating member of stage 1000, or threshold values for min/max peaks can be stored or predefined for at least one signal for converting between changes in signal to calculating actual velocity or distance. In some embodiments the relation may be considered linear, or lookup table from which velocity or distance can be calculated may be implemented or other indicative data for measuring any motion indication responsive to changes in the signal may be implemented without exceeding the scope.

In stage 1030, responsive to rotation of the rotating member, intensity values of at least two MFCs from the sensor(s) of stage 1010 are read, the read values denoted magnetic vector components (MVCs). MVCs may be analog voltages or a digital word or other signal describing the MFC read. It is preferred to read two MFCs in order to determine motion such as direction, for which at least two MFCs are required, and velocity or distance which may be better calculated using two MFCs at each instant, however, reading one MFC with a 1D sensor might be sufficient in some embodiments, to determine there is motion, and to find out location/velocity even if it is with less accuracy and direction of motion across surface 90, i.e. the direction of gliding, is not directly derived.

In optional stage 1040, the read values are normalized responsive to the calibration of stage 1020 to obtain normalized MVCs (NMVCs). Optional stage 1040 may be required in an embodiment in which two sensors and two magnets are used and they have substantial tolerances which cause variance of the resultant MVCs. If however the two magnets are fixed in equivalent positions to their sensors and their tolerances are small then the expected min/max peaks can be determined in advance, and in such cases, for example, no calibration or normalization may be required. Nevertheless such normalization and/or calibration can still improve accuracy such as of calculating velocity.

In stage 1050 the velocity of motion of the apparatus of stage 1000 is determined responsive to the MVCs, which in the case in which optional stage 1040 is performed is through the medium of the NMVCs. In one embodiment, the sensor reading nearest the maximum amplitude value is disregarded, and the orthogonal sensor reading is used, since the orthogonal reading may be in the about linear, or near linear, range. Other algorithms for calculating motion may be implemented as well, such as using one or more thresholds, calculating the signals' slopes, using thresholds, performing linear or nonlinear approximations or estimations, using filters in software and/or in hardware. Other metrics other than velocity may be determined, thus there may be a need to find distance or position of the roller, for example, in order to provide limited treatment at a specified skin position, and in such a case velocity need not be found.

In stage 1060 the direction of motion is identified responsive to the MVCs. In particular, based on at least 2 readings over time for at least two orthogonal MVCs the direction can be determined.

Stages 1050 and 1060 can take place if both velocity and direction are required, for example position can be calculated instead such as by lookup table or phase approximation according to MVCs position on graph and then direction and position can be found without calculating speed, this may allow sampling the sensors at lower time rate or not knowing when sampling takes places, such as not in fixed real time intervals but according to need. If, however, the sensors are not sampled in proper rate, and the roller has passed more than 360 degrees (full turn) without being monitored by the sensors, then the exact location or distance travelled by the roller, might be unknown.

Thus, based on at least one bipolar magnet, rotating along with a rotating member, velocity and direction can be determined along with other motion indications.

The aesthetical/medical treatment apparatus may refer to a device having a housing, or to an apparatus having several components such as a Hand Piece (HP) connected to a stationary unit, wherein the HP may form the housing described herein, for example. Thus the sensor may be implemented in consumer, standalone devices as well as in professional apparatuses.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. In the claims of this application and in the description of the invention, except where the context requires otherwise due to express language or necessary implication, the word "comprise" or variations such as "comprises" or "comprising" is used in any inclusive sense, i.e. to specify the presence of the stated features but not to preclude the presence or addition of further features in various embodiments of the invention.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting. No admission is made that any reference constitutes prior art. The discussion of the reference states what their author's assert, and the applicants reserve the right to challenge the accuracy and pertinency of the cited documents. It will be clearly understood that, although a number of prior art complications are referred to herein, this reference does not constitute an admission that any of these documents forms part of the common general knowledge in the art in any country.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An aesthetic or medical treatment device comprising:
   a housing;
   a controller;
   a treatment element responsive to said controller; and
   a motion sensor, said controller arranged to receive information from said motion sensor and to adjust operation of the treatment element responsive thereto,
   said motion sensor comprising:
   a rotating member secured to said housing and arranged to rotate about a rotation axis of said rotating member responsive to motion of said housing across a skin surface to be treated;
   at least one bipolar magnet fixed within said rotating member so as to rotate together with rotating member; and
   a transducer secured to said housing and juxtaposed with said rotating member, said transducer arranged to read at least one magnetic field component (MFC) of said at least one bipolar magnet, and provide an output signal indicative of rotation of said rotating member.

2. The aesthetic or medical treatment device of claim 1, wherein the magnetic axis of said at least one bipolar magnet is perpendicular to said rotation axis and wherein said transducer is parallel to said rotation axis.

3. The aesthetic or medical treatment device of claim 2, wherein said at least one bipolar magnet comprises two bipolar magnets set orthogonally to each other and wherein said transducer is comprised of two magnetic field sensors, and wherein each of the magnetic field sensors is juxtaposed with a particular one of the two bipolar magnets.

4. The aesthetic or medical treatment device of claim 3, wherein said transducer is a Hall effect sensor.

5. The aesthetic or medical treatment device of claim 4, wherein said Hall effect sensor is one of a 2 dimensional Hall effect sensor and a 3 dimensional Hall effect sensor.

6. The aesthetic or medical treatment device of claim 1, further comprising a motion determiner arranged to receive the output signal of said transducer, said motion determiner arranged to determine the rate of motion of said housing across the surface responsive to said received output signal, and output said information regarding said determined motion to said controller.

7. The aesthetic or medical treatment device of claim 6, wherein said motion determiner is arranged to determine velocity.

8. The aesthetic or medical treatment device of claim 6, wherein said motion determiner is arranged to determine direction of motion of said housing in relation to the skin surface.

9. The aesthetic or medical treatment device of claim 6, wherein said motion determiner is arranged to determine the position of said housing on the skin surface.

10. The aesthetic or medical treatment device of claim 6, wherein said motion determiner is arranged to determine at least two of: velocity; direction of motion of said housing in relation to the skin surface; and the position of said housing on the skin surface.

11. The aesthetic or medical treatment device of claim 1, wherein said MFCs are perpendicular to each other.

12. The aesthetic or medical treatment device of claim 1, wherein said at least one bipolar magnet is centered in the rotation axis of said rotating member.

13. A motion sensor comprising:
   a housing;
   a rotating member secured to said housing and arranged to rotate about a rotation axis of said rotating member responsive to motion of said housing across a surface;
   at least one bipolar magnet secured to said rotating member so as to rotate about the rotation axis of said rotating member with said rotation of said rotating member; and
   a transducer secured to said housing and juxtaposed with said rotating member, said transducer arranged to vary its output voltage in response to changes in magnetic field caused by said rotation of said at least one bipolar magnet.

14. The motion sensor of claim 13, wherein said at least one bipolar magnet comprises two bipolar magnets set orthogonally to each other.

15. The motion sensor of claim 13, wherein said transducer is a Hall effect sensor.

16. The motion sensor of claim 15, wherein said Hall effect sensor is one of a 2 dimensional Hall effect sensor and a 3 dimensional Hall effect sensor.

17. The motion sensor of claim 13, wherein said at least one bipolar magnet comprises two bipolar magnets set orthogonally to each other, and wherein said transducer comprises two Hall effect sensors, each of said Hall effect sensors set orthogonally to each other.

18. The motion sensor of claim 13, further comprising a motion determiner arranged to receive the output of said transducer, said motion determiner arranged to determine the rate of motion of said housing across the surface responsive to said received output.

19. The motion sensor of claim 18, wherein said motion determiner is arranged to determine the rate of rotation of said rotating member responsive to said received output, said rate of motion determined responsive to said determined rate of rotation.

20. The motion sensor of claim 18, wherein said motion determiner is arranged to:
   receive at least one magnetic vector component from said transducer;
   normalize said received at least one vector component; and
   determine the rate of motion responsive to the normalized received at least one vector component.

21. The motion sensor of claim 13, wherein the motion sensor is adapted to be placed in an aesthetical or medical treatment device.

22. The motion sensor of claim 13, wherein the sensor is adapted to detect velocity and direction of motion of the housing across the surface.

23. The motion sensor of claim 13, wherein a diameter of the rotating member is smaller than 20 mm.

24. The motion sensor of claim 13, wherein a distance between the rotation axis and the transducer is smaller than 20 mm.

* * * * *